United States Patent
Chen et al.

(10) Patent No.: US 12,257,966 B2
(45) Date of Patent: Mar. 25, 2025

(54) AUTOMOBILE SELF-LOCKING TYPE BUMPER

(71) Applicant: Weihai Mingxinde Machining Co., Ltd., Weihai (CN)

(72) Inventors: Lubin Chen, Weihai (CN); Xueliang Wang, Lianyungang (CN)

(73) Assignee: Weihai Mingxinde Machining Co., Ltd., Weihai (CN)

( * ) Notice: Subject to any disclaimer, the term of this patent is extended or adjusted under 35 U.S.C. 154(b) by 336 days.

(21) Appl. No.: 17/987,053

(22) Filed: Nov. 15, 2022

(65) Prior Publication Data

US 2024/0010149 A1    Jan. 11, 2024

(30) Foreign Application Priority Data

Jul. 11, 2022    (CN) .......................... 202221772346.X

(51) Int. Cl.
   *B60R 19/38*    (2006.01)
   *B60R 19/02*    (2006.01)
   *B60R 19/46*    (2006.01)

(52) U.S. Cl.
   CPC ............ *B60R 19/38* (2013.01); *B60R 19/023* (2013.01); *B60R 19/46* (2013.01)

(58) Field of Classification Search
   CPC ........ B60R 2019/522; B60R 2019/525; B60R 2019/527; B60R 19/023; B60R 19/14; B60R 19/38; B60R 19/44; B60R 19/46; B60R 19/52; B60R 19/54; E05B 77/00
   USPC .................................. 293/118, 142, 143, 145
   See application file for complete search history.

(56) References Cited

U.S. PATENT DOCUMENTS 8,070,196 B2 *  12/2011  Couto ..................... B60R 19/48
                                             293/118
11,230,241 B2 *  1/2022  Drever .................... B60R 19/52

FOREIGN PATENT DOCUMENTS

CN          210502883 U  *  5/2020

* cited by examiner

*Primary Examiner* — Amy R Weisberg
*Assistant Examiner* — Denise Lynne Esquivel
(74) *Attorney, Agent, or Firm* — Birchwood IP

(57) ABSTRACT

The present application discloses an automobile self-locking type bumper, comprising a bumper body, and is characterized in that a vertical frame, a mounting frame, a connecting frame, a locking and positioning device, and a hinge portion are further provided, and the connecting frame is fixed on a front side of the mounting frame, and the vertical frame is fixed on a rear side of the bumper body. The lower end of the connecting frame on the mounting frame is hinged with the lower part of the vertical frame on the bumper body through the hinge portion, and the upper part is fixedly connected by the locking and positioning device. Due to the above-mentioned structure, the present application has the advantages of novel structure, convenient disassembly and assembly, convenient operation, time-saving and labor-saving, and the like.

8 Claims, 9 Drawing Sheets

AUTOMOBILE SELF-LOCKING TYPE BUMPER

CROSS-REFERENCE TO RELATED APPLICATIONS

This application claims the benefit and priority of Chinese patent application No. 202221772346X, filed on Jul. 11, 2022, disclosure of which is hereby incorporated by reference in its entirety.

TECHNICAL FIELD

The present application relates to the technical field of automobile protective equipment, in particular to an automobile self-locking type bumper.

BACKGROUND

At present, the bumpers of motor vehicles at home and abroad are all lifted manually. For the bumper of a truck, the weight is 45-55 kg. It is easy to put down, but it is very difficult to lift up. Therefore, many people are required to carry and install and fix it, which leads to high labor intensity and inconvenient disassembly and assembly.

SUMMARY

In order to solve the substantial deficiencies in the prior art, the present application provides an automobile self-locking type bumper which has novel structure, convenient disassembly and assembly, convenient operation, time-saving and labor-saving, and good buffering effect.

The technical means adopted by the present application to solve the above-mentioned technical problems are:

An automobile self-locking type bumper, comprising a bumper body 1, wherein a mounting frame 4, a connecting frame 5, a locking and positioning device 6, and a hinge portion 7 are further provided, and the connecting frame 5 is fixed on a front side of the mounting frame 4, and a lower end of the connecting frame 5 on the mounting frame 4 is hinged with a lower part of the vertical frame 2 on the bumper body 1 through the hinge portion 7, and an upper part is fixedly connected through the locking and positioning device 6, so as to facilitate the quick disassembly and assembly of the locking and positioning device 6 and the hinge portion 7, so as to achieve the functions of convenient operation, time saving and labor saving, and low labor intensity.

In the present application, the locking and positioning device 6 is composed of a lock device 64 and a lock cylinder 6-2, and the lock cylinder 6-2 is fixed on the connecting frame 5, the lock device 6-1 is fixed on the vertical frame 2, wherein the lock device and the lock cylinder 6-2 are matched and locked together, when the bumper body 1 and the mounting frame 4 are fixed.

In the present application, the lock device 6-1 is composed of a fixed plate 644, fixed side plates 6-1-2, upper locking hooks 6-1-3, a lower locking hook 6-1-4, an unlocking lever 64-5, a tension spring 6-1-6, a torsion spring 6-1-7, limiting lever 6-1-8, an upper hinge shaft 6-1-9, a lower hinge shaft 6-140, and a tension spring hinge shaft 6-1-1.1, The fixing plates 6-1-1 are respectively fixed on the side surfaces of the bumper body 1, and the fixing plate 6-1-1 are provided with movable through holes, and the fixed side plates 6-1-2 are respectively fixed on both sides of the corresponding movable through holes at the lower end of the fixed plate 6-1-1, and mounting supports for tension spring 6-1-6 are respectively fixed on both sides of the movable through hole at the upper end, the unlocking lever 6-1-5 is arranged above the fixing plate 6-1-1, and the locking hook 6-1-3 is arranged below, The tension spring 6-1-6 passes through the movable through hole, and the upper end of the tension spring is connected to the tension spring hinge shaft 6-1-11 connected to the mounting support of the tension spring 6-1-6, and the lower end is hinged with the rear end of the upper locking hook 6-1-3, The upper end of the upper locking hook 6-1-3 movably passes through the movable through hole and is fixedly connected with the unlocking lever 6-1-5, the upper locking hook 6-1-3 is hinged with the fixed side plate 6-1-2 through the upper hinge shaft 6-1-9, a lock cylinder lower groove is arranged in front of the lower part of the upper locking hook 6-1-3, and the rear of the lower part protrudes downward and is fixed with the limiting lever 6-1-8, The front end of the lock cylinder lower groove transitions to the lock cylinder lower groove in an arc shape, so as to guide the lock cylinder 6-2, The lower locking hook 6-1-4 is located at the lower part of the upper locking hook 6-1-3, and the middle part of the lower locking hook 6-1-4 is provided with a special-shaped through groove, the rear end of the lower locking hook 6-1-4 is hinged with the fixed side plate 6-1-2 via the lower hinge shaft 6-1-10 and the torsion spring 6-1-7, the upper end of the lower locking hook 6-1-4 is provided with a lock cylinder upper groove, and the front end of the lower locking hook 6-1-4 transitions to the lock cylinder upper groove in an arc shape, so as to guide the lock cylinder 6-2, the limiting lever 6-1-8 is slidably inserted into the special-shaped through grooves, Two ends of the lock cylinder 6-2 are respectively fixedly connected to a mounting seat through a support, and the lock cylinder 6-2 corresponds to the lock device 6-1, when the bumper body 1 rotates around the hinge portion and is fixed with the mounting frame, that is, the limiting lever 6-1-8 slides to the rear end of the special-shaped through groove, the lock cylinder upper groove and the lock cylinder lower groove corresponds to each other and constitute a lock cylinder hole that restricts the movement of the lock cylinder 6-2, thereby locking the lock cylinder 6-2 in the lock cylinder hole; when the bumper body 1 rotates around the hinge portion and is separated from the mounting frame, that is, the limiting lever 6-1-8 slides to the front end of the special-shaped through groove, the lock cylinder upper groove and the lock cylinder lower groove are separated from each other, so that the lock cylinder 6-2 is removed from the lock cylinder hole. As a result, the functions of convenient disassembly and assembly, convenient operation, time saving and labor-saving are realized.

In the present application, the upper ends of the two lock devices 6-1 at the rear of the bumper body 1 are provided with linkage levers 6-3, and the two ends of the linkage lever 6-3 are respectively fixedly connected with the unlocking lever 6-1-5, so that when the bumper body 1 is pushed, the linkage lever 6-3 located at the rear is pulled, and the linkage lever 6-3 drives the two lock devices 6-1 to act simultaneously to realize the quick opening of the lock device.

In the present application, the locking and positioning device 6 is composed of locking nuts 6-4 and a locking bolts 6-5, and the connecting frame 6 has at least one mounting through hole 11, and the vertical frame 2 is provided with at least one connecting hole 2-1 corresponding to the mounting through hole 11, wherein the bolts pass through the mounting through hole and the connecting hole in turn to connect the hinge plate and the connecting frame through the locking nut 6-4, when the bumper body 1 rotates around the hinge portion and is fixed to the mounting frame. Thus, a stable and fixed connection between the bumper body 1 and the mounting frame is achieved.

In the present application, a lifting device 3 is respectively provided on both sides of the mounting frame, and an upper end of the lifting device 3 is hinged with the upper part of the connecting frame 5, and an lower end is hinged with a hinge shaft 10 fixed on the bumper body 1. This facilitates lifting the heavy bumper body 1 hinged with the connecting frame 6 by the lifting device 3. The bumper body 1 is erected and leans against the mounting frame 4, and then the locking bolt 6-5 passes through the connecting hole 2-1 on the vertical frame 2 and the mounting through hole 11 on the connecting frame 6, and then is threaded with the locking nuts 6-4 to lock the vertical frame 2 and the connecting frame 6. As a result, the functions of convenient disassembly and assembly, convenient operation, time-saving and labor-saving are realized.

In the present application, a buffer block 12 is provided between the bumper body 1 and the mounting frame 4, and one end of the buffer block 12 abuts against the bumper body 1, and the other end abuts against the mounting frame 4. The buffer block 4 is made of rubber material, so as to increase the buffering effect of the bumper body 1 during collision and reduce the impact force.

In the present application, the lifting device 3 is composed of a pushing lever 34 and a controller 3-2, and the pushing lever 34 is controlled by the controller 3-2 to control the extension or retraction of the pushing lever, and the pushing lever may be an electric pushing lever, a pneumatic pushing lever, or a hydraulic pushing lever.

In the present application, the hinged portion may adopt a pin-shaft hinged manner, or a binged manner in which a bolt and a nut are matched.

In the present application, the special-shaped through groove is formed by cross-connecting a locking long hole and an opening long hole, and the intersection angle of the locking long hole and the opening long hole is greater than 90 degrees, wherein the opening long hole extends in a horizontal direction, when the lower locking groove and the upper locking groove are butted and locked.

Due to the above-mentioned structure, the present application has the advantages of novel structure, convenient disassembly and assembly, convenient operation, time-saving and labor-saving, and good buffering effect.

Figure 1:
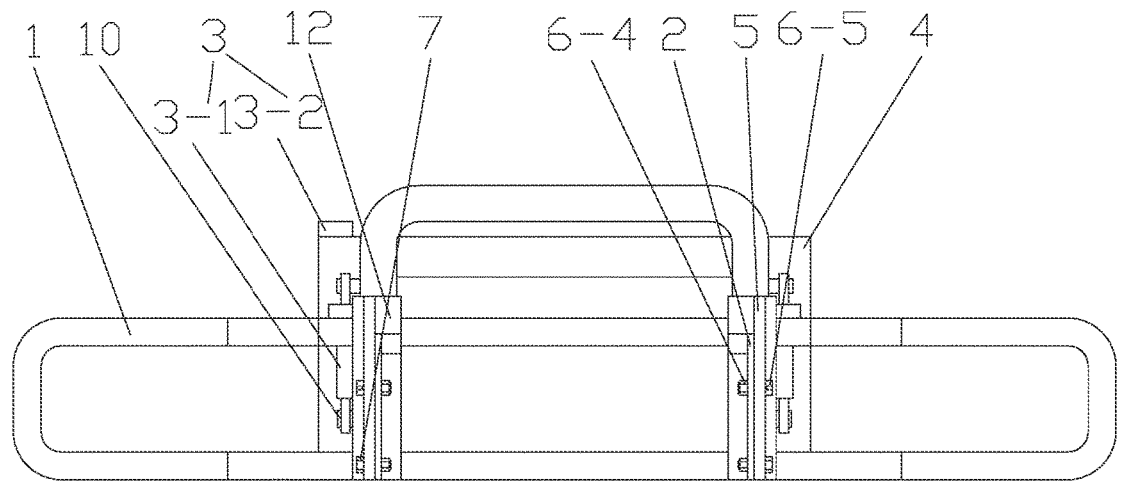
FIG. 1 is a schematic structural diagram of Embodiment 1 of the present application.
Figure 2:
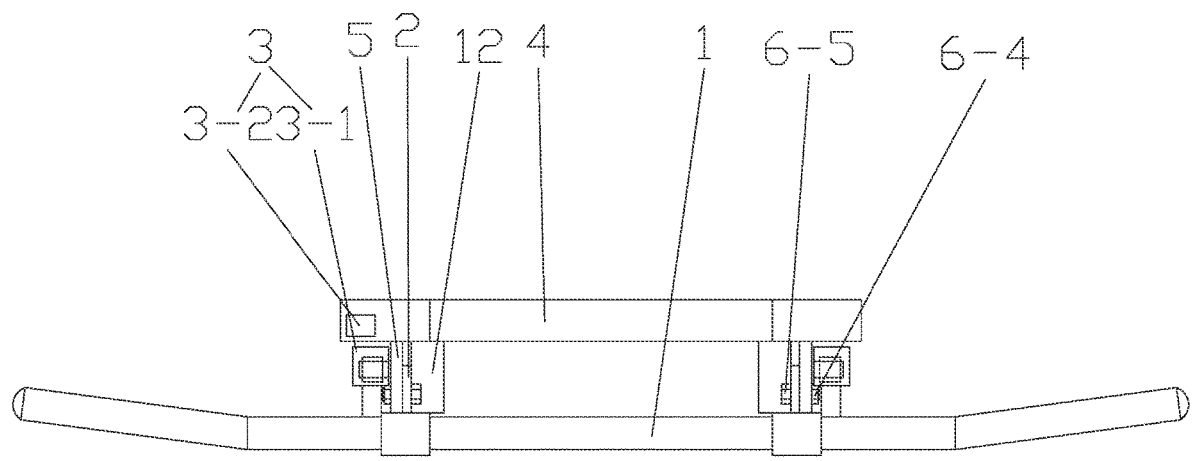
FIG. 2 is a left side view of FIG. 1.
Figure 3:
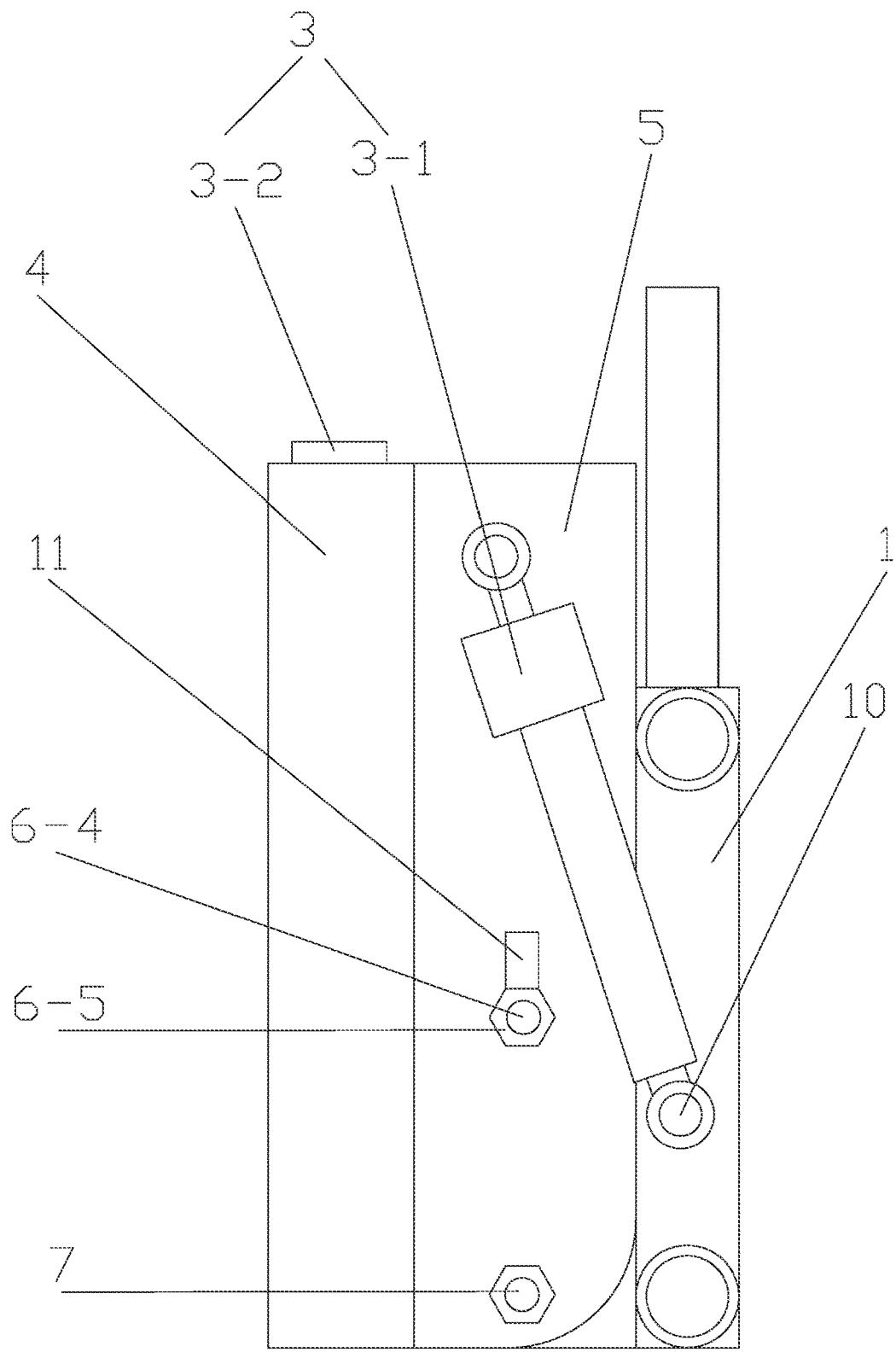
FIG. 3 is a bottom view of FIG. 1 (it is also a state in which the bumper body 1 and the mounting frame are fixed).
Figure 4:
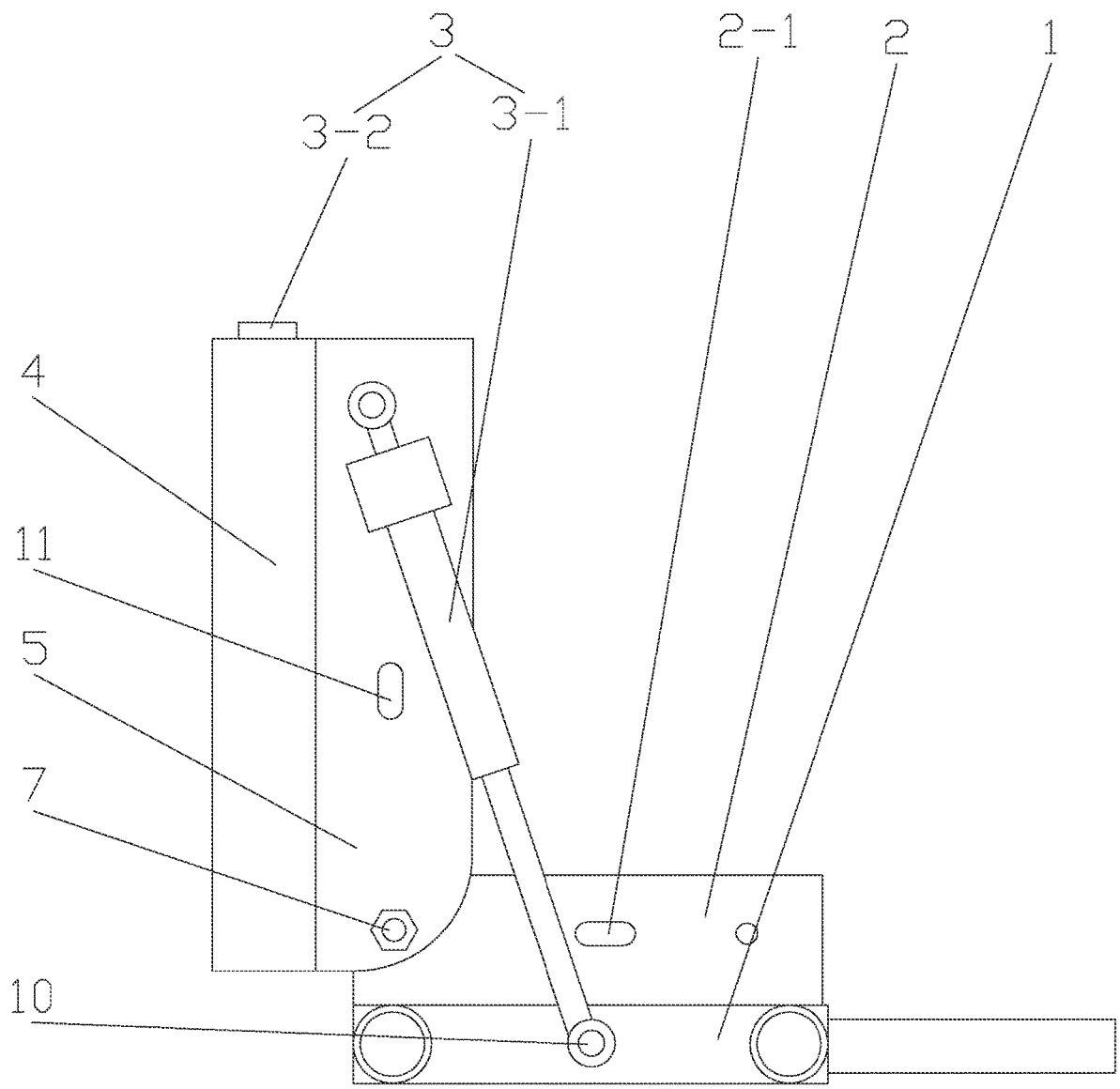
FIG. 4 is a schematic structural diagram of the bumper body 1 of the present application when it is installed.

Bumper body 1, Vertical frame 2, Connecting hole 2-1, g device 3, Mounting frame 4, Connecting frame 5, Locking and positioning device 6, Lock device 64, Fixing plate 6-14, Fixing side plate 64-2, Upper locking hook 64-3, Lower locking hook 6-1-4, Unlocking lever 6-1-5, Tension spring 6-1-6, Torsion spring 6-1-7, limiting lever 64-8, Upper hinge shaft 6-1-9, Lower hinge shaft 6-1-10, Tension spring hinge shaft 6-1-11, Lock cylinder 6-2, linkage lever 6-3, Locking nut 6-4, Locking bolt 6-5, Hinge portion 7, Hinge shaft 9, Hinge shaft 10, Mounting through hole 11, Buffer block 12.

DETAILED DESCRIPTION

The present application will be described below with reference to the accompanying drawings and embodiments.

As shown in the attached drawings, an automobile self-locking type bumper comprises a bumper body 1, wherein a mounting frame 4, a connecting frame 5, a locking and positioning device 6, and a hinge portion 7 are further provided, and the connecting frame 5 is fixed on a front side of the mounting frame 4, and a lower end of the connecting frame 5 on the mounting frame 4 is hinged with a lower part of the vertical frame 2 on the bumper body 1 through the hinge portion 7, and an upper part is fixedly connected through the locking and positioning device 6, so as to facilitate the quick disassembly and assembly of the locking and positioning device 6 and the hinge portion 7, so as to achieve the functions of convenient operation, time saving and labor saving, and low labor intensity.

In the present application, the locking and positioning device 6 is composed of a lock device 6-1 and a lock cylinder 6-2, and the lock cylinder 6-2 is fixed on the connecting frame 5, the lock device 6-1 is fixed on the vertical frame 2, wherein the lock device and the lock cylinder 6-2 are matched and locked together, when the bumper body 1 and the mounting frame 4 are fixed.

In the present application, the lock device 6-1 is composed of a fixed plate 6-1-1, fixed side plates 6-1-2, upper locking hooks 6-1-3, a lower locking hook 6-1-4, an unlocking lever 6-1-5, a tension spring 6-1-6, a torsion spring 6-1-7, limiting lever 6-1-8, an upper hinge shaft 6-1-9, a lower hinge shaft 6-1-10, and a tension spring hinge shaft 6-1-11, The fixing plates 6-1-1 are respectively fixed on the side surfaces of the bumper body 1, and the fixing plate 6-1-1 are provided with movable through holes, and the fixed side plates 6-1-2 are respectively fixed on both sides of the corresponding movable through holes at the lower end of the fixed plate 6-1-1, and mounting supports for tension spring 6-1-6 are respectively fixed on both sides of the movable through hole at the upper end, the unlocking lever 6-1-5 is arranged above the fixing plate 6-1-1, and the locking hook 6-1-3 is arranged below, The tension spring 6-1-6 passes through the movable through hole, and the upper end of the tension spring is connected to the tension spring hinge shaft 6-1-11 connected to the mounting support of the tension spring 6-1-6, and the lower end is hinged with the rear end of the upper locking hook 6-1-3, The upper end of the upper locking hook 6-1-3 movably passes through the movable through hole and is fixedly connected with the unlocking lever 6-1-5, the upper locking hook 6-1-3 is hinged with the fixed side plate 6-1-2 through the upper hinge shaft 6-1-9, a lock cylinder lower groove is arranged in front of the lower part of the upper locking hook 6-1-3, and the rear of the lower part protrudes downward and is fixed with the limiting lever 6-1-8, The front end of the lock cylinder lower groove transitions to the lock cylinder lower groove in an arc shape, so as to guide the lock cylinder 6-2, The lower locking hook 6-1-4 is located at the lower part of the upper locking hook 6-1-3, and the middle part of the lower locking hook 6-1-4 is provided with a special-shaped through groove, the rear end of the lower locking hook 6-1-4 is hinged with the fixed side plate 6-1-2 via the lower hinge shaft 6-1-10 and the torsion spring 6-1-7, the upper end of the lower locking hook 6-1-4 is provided with a lock cylinder upper groove, and the front end of the lower locking hook 6-1-4 transitions to the lock cylinder upper groove in an arc shape, so as to guide the lock cylinder 6-2, the limiting lever 6-1-8 is slidably inserted into the special-shaped through grooves, Two ends of the lock cylinder 6-2 are respectively fixedly connected to a mounting seat through a support, and the lock cylinder 6-2 corresponds to the lock device 6-1, when the bumper body 1 rotates around the hinge portion and is fixed with the mounting frame, that is, the limiting lever 6-1-8 slides to the rear end of the special-shaped through groove, the lock cylinder upper groove and the lock cylinder lower groove corresponds to each other and constitute a lock cylinder hole that restricts the movement of the lock cylinder 6-2, thereby locking the lock cylinder 6-2 in the lock cylinder hole; when the bumper body 1 rotates around the hinge portion and is separated from the mounting frame, that is, the limiting lever 6-1-8 slides to the front end of the special-shaped through groove, the lock cylinder upper groove and the lock cylinder lower groove are separated from each other, so that the lock cylinder 6-2 is removed from the lock cylinder hole. As a result, the functions of convenient disassembly and assembly, convenient operation, time-saving and labor-saving are realized.

In the present application, the upper ends of the two lock devices 6-1 at the rear of the bumper body 1 are provided with linkage levers 6-3, and the two ends of the linkage lever 6-3 are respectively fixedly connected with the unlocking lever 6-1-5, so that when the bumper body 1 is pushed, the linkage lever 6-3 located at the rear is pulled, and the linkage lever 6-3 drives the two lock devices 6-1 to act simultaneously to realize the quick opening of the lock device.

In the present application, the locking and positioning device 6 is composed of locking nuts 6-4 and a locking bolts 6-5, and the connecting frame 6 has at least one mounting through hole 11, and the vertical frame 2 is provided with at least one connecting hole 2-1 corresponding to the mounting through hole 11, wherein the bolts pass through the mounting through hole and the connecting hole in turn to connect the hinge plate and the connecting frame through the locking nut 6-4, when the bumper body 1 rotates around the hinge portion and is fixed to the mounting frame. Thus, a stable and fixed connection between the bumper body 1 and the mounting frame is achieved.

In the present application, a lifting device 3 is respectively provided on both sides of the mounting frame, and an upper end of the lifting device 3 is hinged with the upper part of the connecting frame 5, and an lower end is hinged with a hinge shaft 10 fixed on the bumper body 1. This facilitates lifting the heavy bumper body 1 hinged with the connecting frame 6 by the lifting device 3. The bumper body 1 is erected and leans against the mounting frame 4, and then the locking bolt 6-5 passes through the connecting hole 2-1 on the vertical frame 2 and the mounting through hole 11 on the connecting frame 6, and then is threaded with the locking nuts 6-4 to lock the vertical frame 2 and the connecting frame 6. As a result, the functions of convenient disassembly and assembly, convenient operation, time-saving and labor-saving are realized.

In the present application, a buffer block 12 is provided between the bumper body 1 and the mounting frame 4, and one end of the buffer block 12 abuts against the bumper body 1, and the other end abuts against the mounting frame 4. The buffer block. 4 is made of rubber material, so as to increase the buffering effect of the bumper body 1 during collision and reduce the impact force.

In the present application, the lifting device 3 is composed of a pushing lever 3-1 and a controller 3-2, and the pushing lever 3-1 is controlled by the controller 3-2 to control the extension or retraction of the pushing lever, and the pushing lever may be an electric pushing lever, a pneumatic pushing lever, or a hydraulic pushing lever.

In the present application, the hinged portion may adopt a pin-shaft hinged manner, or a hinged manner in which a bolt and a nut are matched.

In the present application, the special-shaped through groove is formed by cross-connecting a locking long hole and an opening long hole, and the intersection angle of the locking long hole and the opening long hole is greater than 90 degrees, wherein the opening long hole extends in a horizontal direction, when the lower locking groove and the upper locking groove are butted and locked.

Embodiment 1: Please refer to accompanying FIGS. 1, 2, 3 and 4, when installing the application, firstly fix the mounting frame 4 on the vehicle chassis at the front end of the truck, move the bumper body 1 to the lower end of the mounting frame, and hinge the lower end of the connecting frame 6 and the vertical frame 2 by the hinge portion 7, and then lift the bumper body 1. At this time, the bumper body 1 rotates around the hinge portion. After the bumper body 1 is placed against the mounting frame, and then the locking bolt 6-5 passes through the connecting hole 2-1 on the vertical frame 2 and the mounting through hole 11 on the connecting frame 6, and then is threaded with the locking nuts 6-4 to lock the vertical frame 2 and the connecting frame 6. In this way; the installation and fixation of the bumper body 1 and the mounting frame 4 is realized, and finally the buffer block 12 is inserted between the bumper body 1 and the mounting frame 4;

Alternatively, when the weight of the bumper body 1 is too heavy, the lifting devices 3 can be installed on both sides of the mounting frame. Then connect the controller 3-2 to the vehicle power supply, click the switch of the controller 3-2, the controller 3-2 drives the telescopic lever of the pushing lever 3-1 to extend, and makes the telescopic lever hinged with the hinge shaft 10 on the bumper body 1. Then click on the controller 3-2 to drive the pushing lever 3-1 back, so that the pushing lever 3-1 drives the bumper body 1 to lift up and lean against the mounting frame 4, and then the locking bolt 6-5 passes through the connecting hole 2-1 on the vertical frame 2 and the mounting through hole 11 on the connecting frame 6, and then is threaded with the locking nuts 6-4 to lock the vertical frame 2 and the connecting frame 6. This greatly reduces the labor intensity, and finally the buffer block 12 is inserted between the bumper body 1 and the mounting frame 4.

Figure 5:
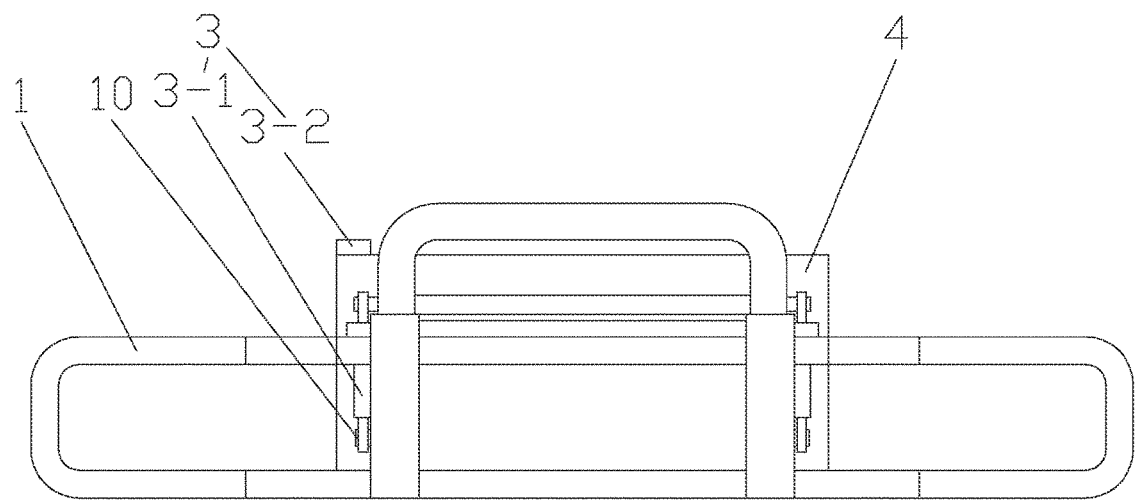
FIG. 5 is a schematic structural diagram of Embodiment 2 of the present application.
Figure 6:
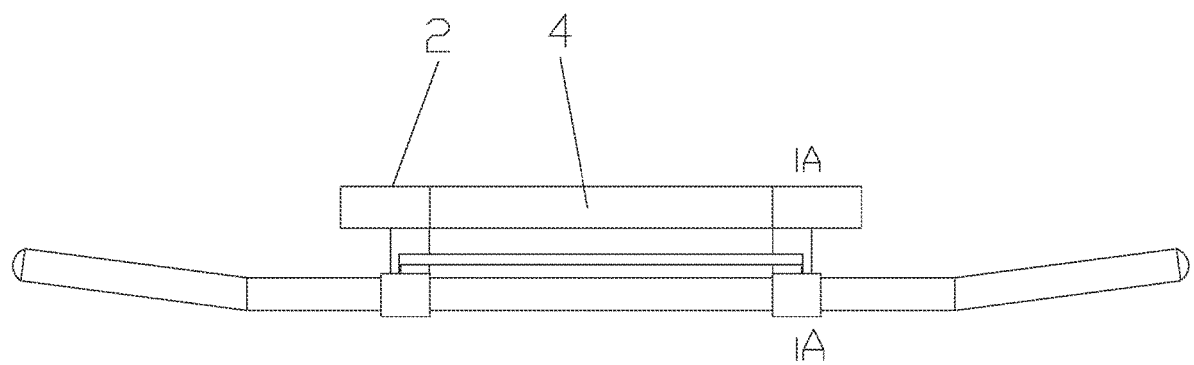
FIG. 6 is a schematic structural plan view of FIG. 5 (with the lifting device removed).
Figure 7:
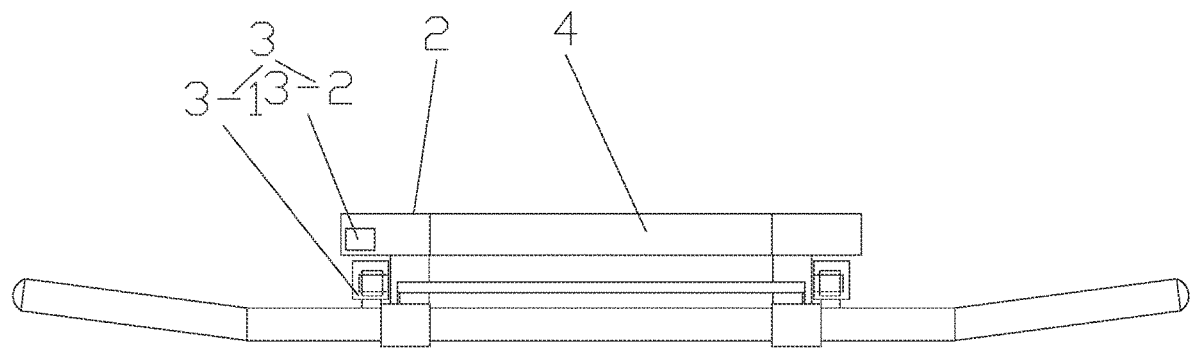
FIG. 7 is a schematic structural plan view of FIG. 5.
Figure 8:
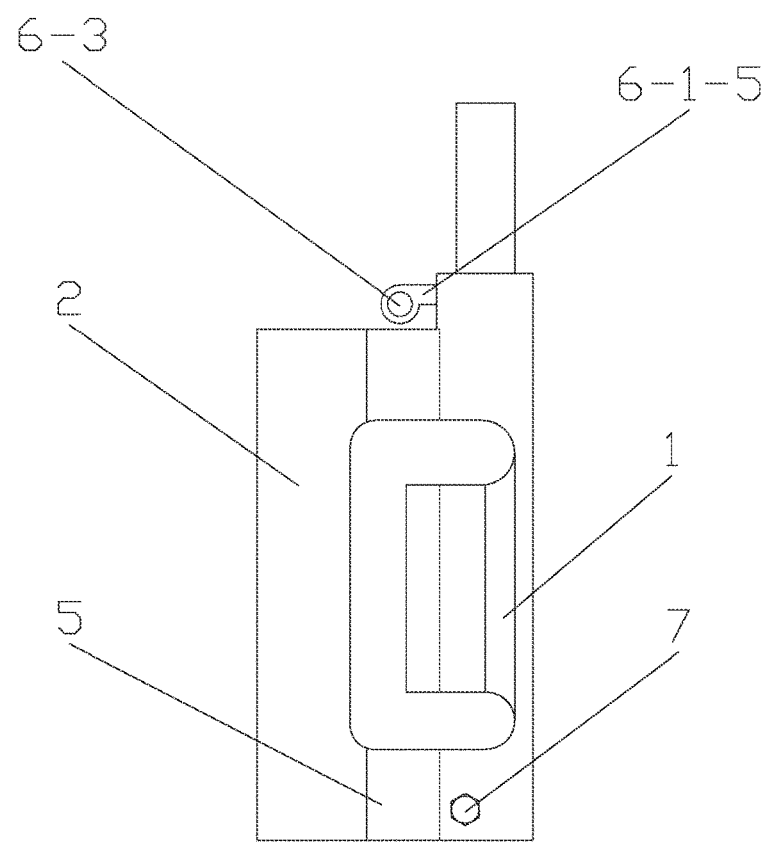
FIG. 8 is a schematic left side view of FIG. 6 (rotated by 90 degrees).
Figure 9:
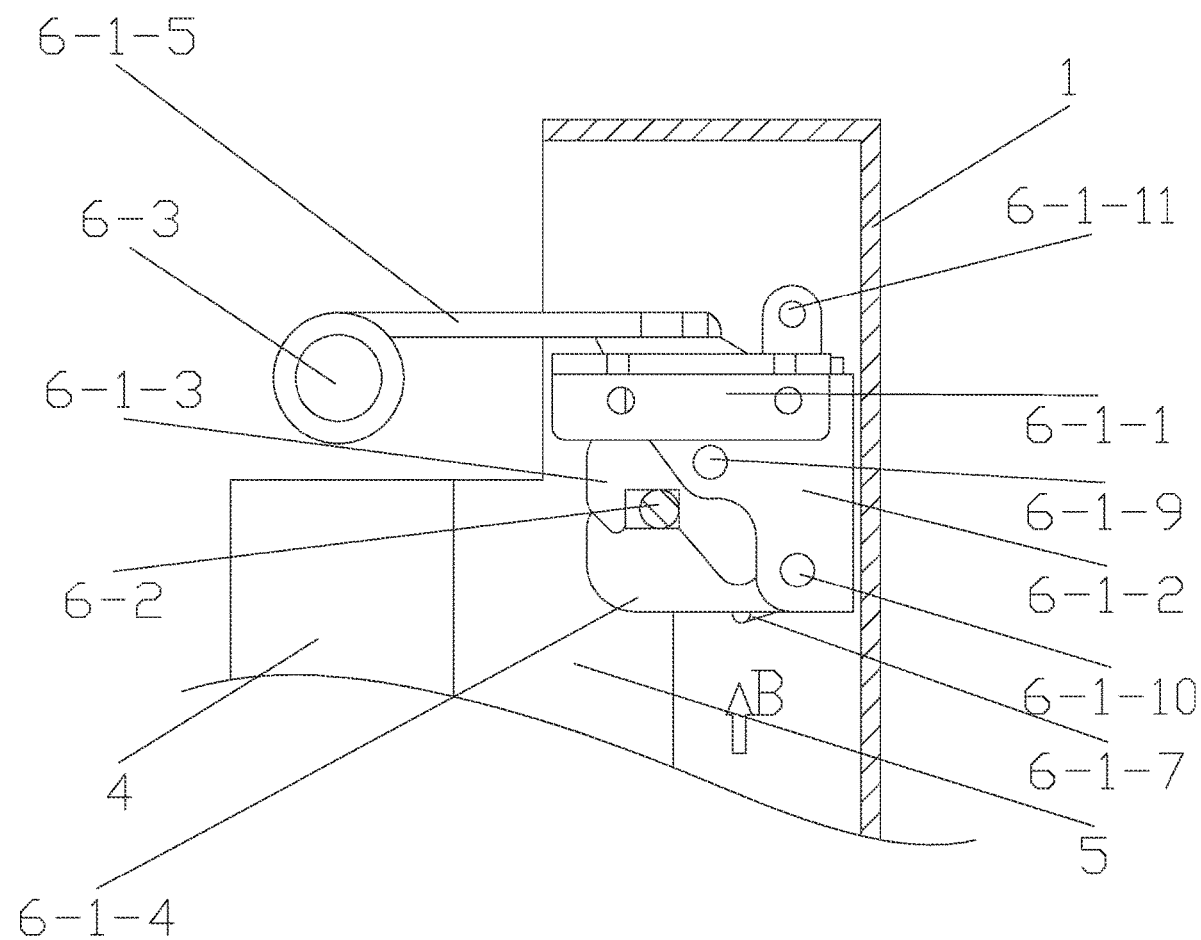
FIG. 9 is a partial cross-sectional view of A-A in FIG. 6.
Figure 10:
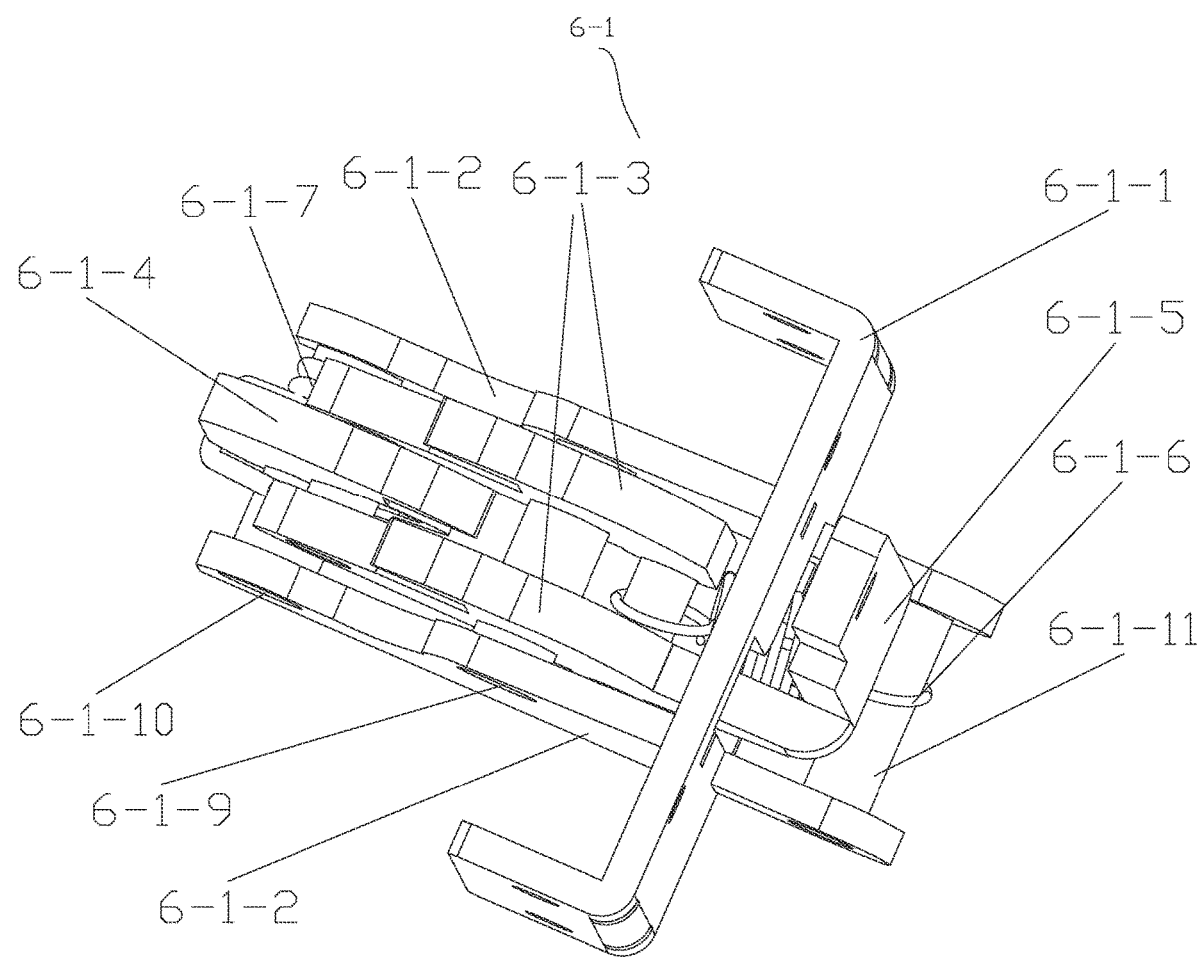
FIG. 10 is a schematic structural diagram in B direction in FIG. 9.
Figure 11:
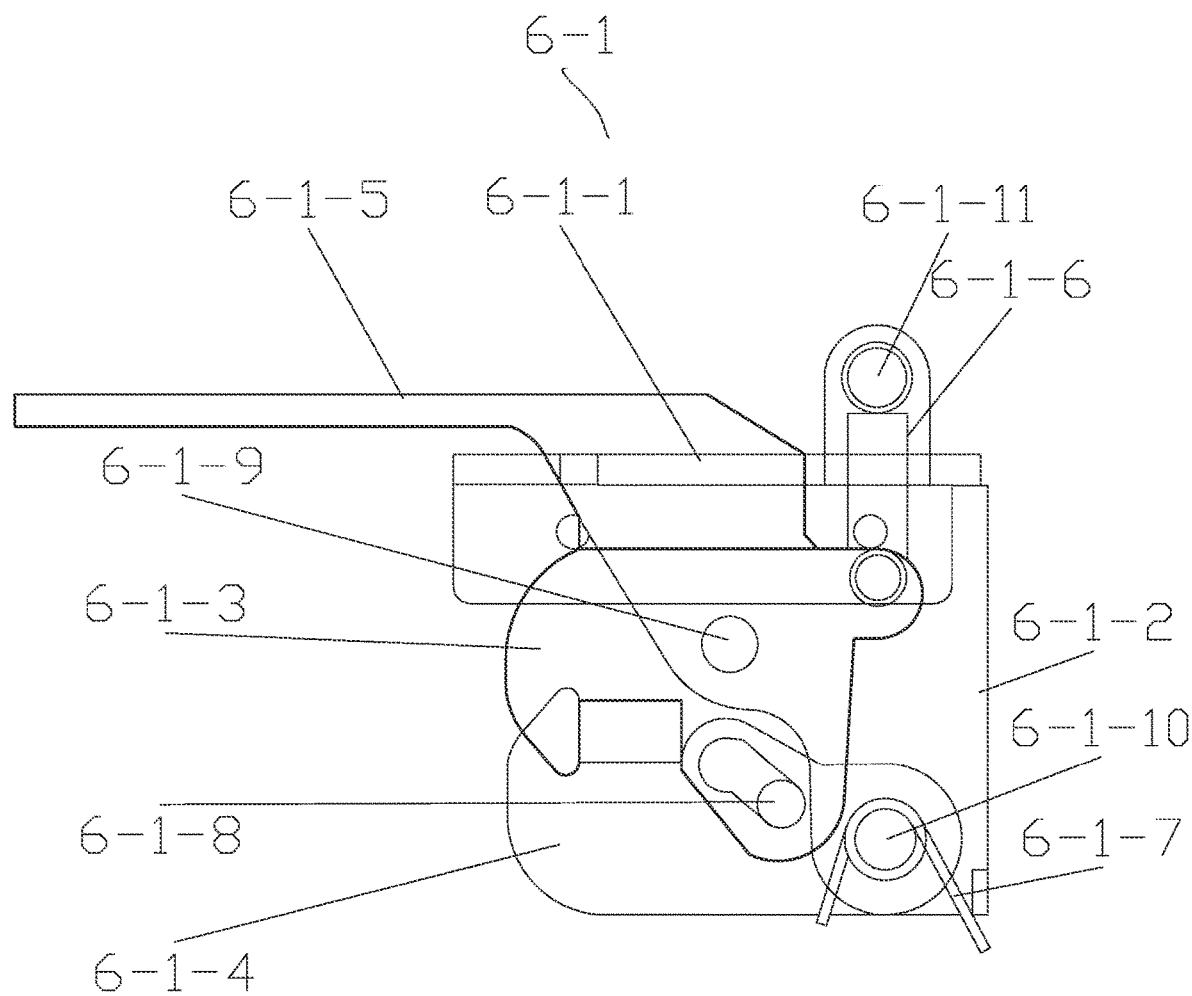
FIG. 11 is a schematic structural diagram of the locking and positioning device.
Figure 12:
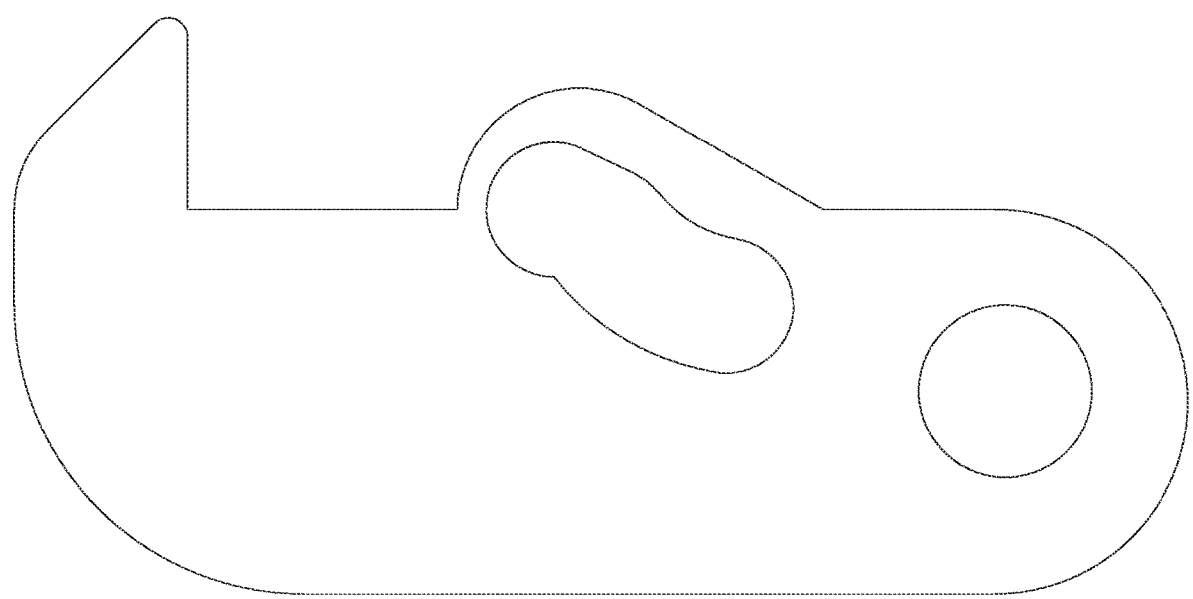
FIG. 12 is a schematic structural diagram of lower hook lock. Reference signs.

Embodiment 2: Please refer to accompanying FIG. 5, when installing the application, firstly fix the mounting frame 4 on the vehicle chassis at the front end of the truck, move the bumper body 1 to the lower end of the mounting frame, and hinge the lower end of the connecting frame 6 and the vertical frame 2 by the hinge portion 7, and then lift the bumper body 1, the bumper body 1 rotates around the hinge portion. When the bumper body 1 is to be fixed with the mounting frame, manually pull the unlocking lever 6-1-5 in the lock device 6-1 outward, or lift the linkage lever 6-3 upward, the linkage lever drives the unlocking lever to rotate, and the unlocking lever 6-1-5 drives the upper locking hook 6-1-3 to rotate with the hinge shaft of the upper locking hook 6-1-3 as the center and open the lock cylinder lower groove upward. At the same time, the limiting lever 6-1-8 on the upper locking hook 6-1-3 moves along the locking long hole of the special-shaped through groove on the lower locking hook 6-1-4 to the opening long hole end of the special-shaped through groove, and pushes the lower locking hook 6-1-4 to rotate with the lower hinge shaft 6-1-10 as the center, so that the lower locking hook 6-1-4 synchronously opens the lock cylinder upper groove downward. When the limiting lever 6-1-8 moves to the end of the opening long hole at the other end of the special-shaped through groove, the upper locking hook stretches the tension spring at the bottom, and at the same time, the lower locking hook squeezes the torsion spring at the bottom, at this time the lock cylinder upper groove and the lock cylinder lower groove are fully opened. When the lock cylinder 6-2 on the mounting frame is to be inserted into the lock cylinder upper groove and the lock cylinder lower groove, the upper locking hook 6-1-3 and the lower locking hook 6-1-4 reset quickly and lock the lock cylinder 6-2 under the action of the thrust of the lock cylinder 6-2, the pulling force of the tension spring 6-1-6 at the rear end of the upper locking hook 6-1-3 and the elastic force of the torsion spring 6-1-7 at the rear end of the lower locking hook 6-1-4. At this time, the unlocking lever 6-1-5 is driven back to its position by the reset of the locking hook 6-1-3, and the limiting lever 6-1-8 is returned from the opening long hole end of the special-shaped through groove to the locking long hole end, thereby realizing the quick fixation between the bumper body 1 and the mounting frame.

When the bumper body 1 needs to be repaired, just lift the linkage lever upward, the linkage lever 6-3 drives the upper locking hook 6-1-3 to rotate around the hinge shaft of the upper locking hook 6-1-3 and open the lock cylinder lower groove upwards. At the same time, the limiting lever 6-1-8 on the upper locking hook 6-1-3 moves along the locking long hole of the special-shaped through groove on the lower locking hook 6-1-4 to the opening long hole end of the special-shaped through groove, and pushes the lower locking hook 6-1-4 to rotate with the lower hinge shaft 6-1-10 as the center, so that the lower locking hook 6-1-4 synchronously opens the lock cylinder upper groove downward. When the limiting lever 6-1-8 moves to the end of the opening long hole at the other end of the special-shaped through groove, the upper locking hook stretches the tension spring at the bottom, and at the same time, the lower locking hook squeezes the torsion spring at the bottom, at this time the lock cylinder upper groove and the lock cylinder lower groove are fully opened. In this way, the bumper body 1 can be quickly separated from the mounting frame.

Alternatively, when the weight of the bumper body 1 is too heavy, the lifting devices can be installed on both sides of the mounting frame. Then connect the controller 3-2 to the vehicle power supply, click the switch of the controller 3-2, the controller 362 drives the telescopic lever of the pushing lever 3-1 to extend, and makes the telescopic lever hinged with the hinge shaft 10 on the bumper body 1. Then click on the controller 3-2 to drive the pushing lever 3-1 back, so that the pushing lever 3-1 drives the bumper body 1 to lift up and lean against the mounting frame 4, and then the locking bolt 6-5 passes through the connecting hole 2-1 on the vertical frame 2 and the mounting through hole 11 on the connecting frame 6, and then is threaded with the locking nuts 6-4 to lock the vertical frame 2 and the connecting frame 6. This greatly reduces the labor intensity, and finally the buffer block 12 is inserted between the bumper body 1 and the mounting frame 4.

Due to the above-mentioned structure, the present application has the advantages of novel structure, convenient disassembly and assembly, convenient operation, time-saving and labor-saving, and good buffering effect.

What is claimed is:

1. An automobile power-lifting bumper, comprising a bumper body,
   wherein a mounting frame, a connecting frame, a locking and positioning device, and a hinge portion are further provided, and the connecting frame is fixed on a front side of the mounting frame, and a lower end of the connecting frame on the mounting frame is hinged with a lower part of a vertical frame on the bumper body through the hinge portion, and an upper part of the vertical frame is fixedly connected through the locking and positioning device;
   wherein the locking and positioning device is composed of locking nuts and locking bolts, and the connecting frame has at least one mounting through hole, the vertical frame is provided with at least one connecting hole corresponding to the mounting through hole,
   wherein the locking bolts pass through the mounting through hole and the connecting hole in turn to connect the vertical frame and the connecting frame through the locking nuts, when the bumper body rotates around the hinge portion and is fixed to the mounting frame.

2. The automobile power-lifting bumper according to claim 1, wherein the locking and positioning device is composed of two lock devices and a lock cylinder, and the lock cylinder is fixed on the connecting frame,
   the two lock devices are fixed on the vertical frame,
   wherein the two lock devices and the lock cylinder are matched and locked together, when the bumper body and the mounting frame are fixed.

3. The automobile power-lifting bumper according to claim 2, wherein the two lock devices are composed of fixing plates, fixed side plates, an upper locking hook, a lower locking hook, an unlocking lever, a tension spring, a torsion spring, a limiting lever, an upper hinge shaft, a lower hinge shaft, and a tension spring hinge shaft,
   the fixing plates are respectively fixed on side surfaces of the bumper body, and the fixing plates are provided with movable through holes, the fixed side plates are respectively fixed on both sides of the corresponding movable through holes at lower ends of the fixing plates, and mounting supports for the tension spring are respectively fixed on both sides of the movable through holes at upper ends of the fixing plates, the unlocking lever is arranged above the fixing plates, and the locking hook is arranged below of the fixing plates,
   the tension spring passes through the movable through holes, and an upper end of the tension spring is connected to the tension spring hinge shaft connected to the mounting support of the tension spring, and a lower end of the tension spring is hinged with a rear end of the upper locking hook, an upper end of the upper locking hook movably passes through the movable through holes and is fixedly connected with the unlocking lever, the upper locking hook is hinged with the fixed side plates through the upper hinge shaft, a lock cylinder lower groove is arranged in front of a lower part of the upper locking hook, and a rear of the lower part of the upper locking hook protrudes downward and is fixed with the limiting lever, a front end of the lock cylinder lower groove transitions to the lock cylinder lower groove in an arc shape, so as to guide the lock cylinder, the lower locking hook is located at the lower part of the upper locking hook, and a middle part of the lower locking hook is provided with a through groove, a rear end of the lower locking hook is hinged with the fixed side plates via the lower hinge shaft and the torsion spring, an upper end of the lower locking hook is provided with a lock cylinder upper groove, and a front end of the lower locking hook transitions to the lock cylinder upper groove in an arc shape, so as to guide the lock cylinder, the limiting lever is slidably inserted into the through grooves, two ends of the lock cylinder are respectively fixedly connected to a mounting seat through a support, and the lock cylinder corresponds to the two lock devices, when the bumper body rotates around the hinge portion and is fixed with the mounting frame, that is, the limiting lever slides to a rear end of the through groove, the lock cylinder upper groove and the lock cylinder lower groove correspond to each other and constitute a lock cylinder hole that restricts a movement of the lock cylinder, thereby locking the lock cylinder in the lock cylinder hole; when the bumper body rotates around the hinge portion and is separated from the mounting frame, that is, the limiting lever slides to a front end of the through groove, the lock cylinder upper groove and the lock cylinder lower groove are separated from each other, so that the lock cylinder is removed from the lock cylinder hole.

4. The automobile power-lifting bumper according to claim 3, wherein the through groove is formed by cross-connecting a locking long hole and an opening long hole, and an intersection angle of the locking long hole and the opening long hole is greater than 90 degrees, wherein the opening long hole extends in a horizontal direction, when a lower locking groove and an upper locking groove are butted and locked.

5. The automobile power-lifting bumper according to claim 4, wherein upper ends of the two lock devices at a rear of the bumper body are provided with linkage levers, and two ends of the linkage levers are respectively fixedly connected with the unlocking lever.

6. The automobile power-lifting bumper according to claim 1, wherein a lifting device is respectively provided on both sides of the mounting frame, and an upper end of the lifting device is hinged with an upper part of the connecting frame, and a lower end of the lifting device is hinged with a hinge shaft fixed on the bumper body.

7. The automobile power-lifting bumper according to claim 6, wherein a buffer block is provided between the bumper body and the mounting frame, and one end of the buffer block abuts against the bumper body, and the other end abuts against the mounting frame.

8. The automobile power-lifting bumper according to claim 6, wherein the lifting device is composed of a pushing lever and a controller, and the pushing lever is controlled by the controller.

\* \* \* \* \*